(12) United States Patent
Juracko

(10) Patent No.: US 6,213,287 B1
(45) Date of Patent: Apr. 10, 2001

(54) CONVEYOR BELT SCRAPER

(76) Inventor: Rudy T. Juracko, Box 6, Star Rte., Mt. Morris, PA (US) 15349

( * ) Notice: Subject to any disclaimer, the term of this patent is extended or adjusted under 35 U.S.C. 154(b) by 0 days.

(21) Appl. No.: 09/379,894

(22) Filed: Aug. 24, 1999

Related U.S. Application Data

(60) Provisional application No. 60/107,020, filed on Nov. 4, 1998.

(51) Int. Cl.⁷ .............................. B65G 45/00; B65G 45/16
(52) U.S. Cl. .................................................... 198/499
(58) Field of Search ................... 198/497, 198, 198/499, 635, 550.8

(56) References Cited

U.S. PATENT DOCUMENTS

| | | | |
|---|---|---|---|
| 4,269,301 | * 5/1981 | Gibbs | 198/499 |
| 4,365,706 | * 12/1982 | Bright | 198/499 |
| 4,696,388 | 9/1987 | Stoll . | |
| 4,795,024 | * 1/1989 | Eatwell | 198/499 |
| 5,113,999 | 5/1992 | Zeppenfeld . | |
| 5,213,197 | 5/1993 | Mohri . | |
| 5,248,026 | 9/1993 | Morefield . | |
| 5,339,947 | * 8/1994 | Campanile | 198/499 |
| 5,372,244 | * 12/1994 | Morin | 198/499 |
| 5,622,249 | 4/1997 | Morin . | |
| 5,722,528 | 3/1998 | Dolan . | |
| 5,735,385 | * 4/1998 | Bowler et al. | 198/499 |
| 5,887,702 | * 3/1999 | Mott | 198/499 |
| 6,076,656 | * 6/2000 | Mat | 198/499 |

FOREIGN PATENT DOCUMENTS

| | | | |
|---|---|---|---|
| 2 040 249 | * 8/1978 | (GB) . | |
| 2 227 992 | * 8/1990 | (GB) . | |
| WO 94/08875 | 4/1994 | (WO) . | |

* cited by examiner

Primary Examiner—Joseph E. Valenza
Assistant Examiner—Kenneth W Bower
(74) Attorney, Agent, or Firm—Richard C. Littman

(57) ABSTRACT

Two embodiments of a conveyor belt scraper are disclosed herein, with each including an inflatable bladder urging a scraper blade against the belt when the bladder is inflated, thereby providing even and uniform pressure for the blade against the belt. In a first embodiment, the scraper blade bears against a free section of the belt, with a guide extending across the opposite side of the belt to support the belt. The bladder is enclosed in a housing, with a blade slot formed in the upper portion thereof. A single belt scraper blade is placed within the housing and extends through the blade slot. A second embodiment urges the blade edge against the belt as the belt passes over a roller on the conveyor line. The blade has a double concave arcuate underside, with the two concave curvatures defining a pivot fulcrum therebetween. The inflatable bladder resides in the concave curvature opposite the scraping blade edge, and urges the blade edge against the belt as the bladder is inflated. In both embodiments, the bladder, housing, and blade have a length extending essentially the entire width of the conveyor belt with which they are installed and used. The blade is preferably formed of a relatively soft material, such as a urethane plastic, to minimize scoring and cutting of the belt. The blade is formed of a relatively thick and deep sheet of material, for reducing bending effects thereto. The bladder may be inflated with any compatible pneumatic or hydraulic fluid, as desired.

9 Claims, 6 Drawing Sheets

US 6,213,287 B1

CONVEYOR BELT SCRAPER

REFERENCE TO RELATED PATENT APPLICATION

This application claims the benefit of U.S. Provisional Patent Application Ser. No. 60/107,020 filed on Nov. 4, 1998.

BACKGROUND OF THE INVENTION

1. Field of the Invention

The present invention relates generally to industrial cleaning mechanisms and devices, and more specifically to an apparatus for applying a scraping blade to a conveyor belt for scraping material therefrom during the operation of the belt. The present invention provides a means for applying an even, uniform scraper pressure across the entire width of the belt, thus eliminating uneven scraping due to sag of the scraper blade. A lower scraper pressure is also required, allowing the use of a relatively soft scraper blade material to reduce greatly the wear and tear on the belt. Two different embodiments are disclosed herein, with the first embodiment directed to a secondary type belt wiper or cleaner, which operates across a free span of the belt, and the second embodiment directed to a primary type belt wiper, which operates across the belt as it passes over a roller.

2. Description of the Related Art

Conveyor belts are used in many different industries (mining, maritime, food processing, etc.) for the conveyance or transfer of raw materials or finished goods from one point to another. Such conveyors, particularly when used for raw materials, generally become contaminated with the materials and require the removal of such material buildup from time to time, in order to avoid contaminating or jamming the equipment.

Accordingly, various devices have been developed for cleaning or scraping down the surface of a conveyor belt. While most such devices provide some moderate success, it must be considered that most were developed for relatively narrow conveyor belts, having a width on the order of about three feet. As such, there is relatively little lateral sag across the belt, and/or across the laterally disposed cleaner or scraper blade. However, with the development of relatively wider conveyor belts for greater productivity, such earlier devices are generally incapable of providing a thorough cleaning or scraping action across the entire width of the belt. Many such belts now have widths of seven to eight feet, and while earlier scrapers have been scaled up to reach across such relatively wide belts, they do not provide the even pressure across the entire width of the belt which is necessary for thorough cleaning of the belt.

Moreover, many such earlier scrapers utilize relatively thin metal scraping blades. This, along with the relatively high scraping pressure required in order to assure scraping action across the entire width of the belt, can result in uneven pressures and possible cutting or scoring of the belt, leading to further difficulty in cleaning the belt and early replacement of the belt.

Accordingly, a need will be seen for a cleaner or scraping device for conveyor belts, which applies an even and uniform pressure across the entire belt by means of fluid activation. The device also includes a single, relatively wide scraper blade of relatively soft material, in order to impart such even and uniform pressures across the entire width of the belt and to avoid cutting or grooving the belt during the scraping operation. The depth of the blade is sufficient to preclude significant distortion or bending thereof, with all forces imparted between the conveyor belt and the scraper blade being evened out by the fluid actuation of the blade. A discussion of the related art of which the present inventor is aware, and its differences and distinctions from the present invention, is provided below.

U.S. Pat. No. 4,696,388 issued on Sep. 29, 1987 to Donald L. Stoll, titled "Conveyor Belt Scraper Blade Assembly With Contoured Surface," describes a scraper having a convex transverse contour, for applying scraping pressure across the center of a conveyor belt having a concave lateral shape due to use and the belt support system. The scraper blades are formed of relatively soft materials (i.e., different rubber durometers), but the Stoll device does not apply an even pressure completely across the belt if the belt does not precisely match the contour of the blade of the device. This is particularly true for a primary type belt cleaner, where the scraper spans the belt across a supporting roller for the belt, which does not allow the belt to flex. Stoll does not disclose any fluid pressure actuating means for his scraper assembly, as is provided by the present invention.

U.S. Pat. No. 5,113,999 issued on May 19, 1992 to Reiner Zeppenfeld, titled "Positionable Doctor Blade," describes an apparatus for applying pressure to an opposed pair of doctor blades or scrapers each bearing against one of a pair of opposed belts on corresponding rollers, i.e., primary wipers or blades. The mechanism used to apply pressure to the blades may utilize fluid pressure (i.e., hydraulic or pneumatic), but the pressure actuator operates only a single arm which is in turn connected between the two blades to apply equal pressure to the two blades. Zeppenfeld does not provide any means for applying even pressure along the entire length of a single blade, as each of his single blades is held in place in a rigid mechanical linkage. Zeppenfeld does not utilize an inflatable bladder disposed transversely along the entire back of the blade for applying uniform pressure to the entire blade across the entire width of the conveyor, as provided by the present invention.

U.S. Pat. No. 5,213,197 issued on May 25, 1993 to Toyoshige Mohri, titled "Belt Cleaner For Conveyor," describes a fluid activated scraper blade array. A transverse bladder is used to apply pressure to a series of blades, which in turn apply scraping pressure to the surface of the conveyor. The blades are tied together by a flexible cover sheet secured to each side thereof. Thus, each blade is somewhat independent of every other blade, particularly for blades which are somewhat laterally separated from one another. In contrast, the present conveyor scraper mechanism uses a single scraper blade which extends essentially the entire width of the conveyor belt to provide a uniform pressure completely thereacross. Also, Mohri utilizes a relatively hard and narrow, sharp material for his blade segments, as opposed to the relatively soft plastic single blade element of the present invention.

U.S. Pat. No. 5,248,026 issued on Sep. 28, 1993 to Allen J. Morefield, titled "Conveyor Belt Scraper Mechanism," describes a fluid actuated mechanism having a single fluid cylinder which in turn actuates an arm which rotates a blade toward or away from the belt. The resulting action is somewhat related to that described in the '999 U.S. patent to Zeppenfeld, described further above, in that the linkage which applies the scraping pressure to the blade is mechanical. Moreover, Morefield utilizes a relatively hard metal blade, unlike the relatively soft plastic material used for the blade of the present scraper invention. Morefield does not disclose an inflatable bladder extending essentially the entire U.S. Pat. No. 5,372,244 issued on Dec. 13, 1994 to Normand J. Morin, titled "Conveyor Belt Scraper,"

describes a fluid expelled plastic scraper blade. The blade is coiled within a chamber, and water under high pressure is forced into the chamber to push the blade from the chamber to compensate for blade wear. Morin does not utilize an inflatable bladder to apply continuous even pressure to the blade against the conveyor belt, as provided by the present invention.

U.S. Pat. No. 5,622,249 issued on Apr. 22, 1997 to Normand J. Morin, titled "Conveyor Belt Scraper," describes a system essentially like that described immediately above in the '244 U.S. patent to the same inventor. The '249 U.S. patent also describes a suspension system for the blade and blade housing, which has no bearing on the present belt scraper invention.

U.S. Pat. No. 5,722,528 issued on Mar. 3, 1998 to Troy D. Dolan, titled "Method And Apparatus For Cleaning Conveyor Belts," describes a device having a transverse support for a plurality of individual blade lift cylinders and corresponding plurality of blades. The Dolan device is exceedingly complex, as it requires a myriad of separate pressure and return lines to feed all of the cylinders of the device. In contrast, the present invention utilizes a single fluid lift mechanism comprising a flexible bladder (not a rigid cylinder), which in turn applies pressure to the edge (in one embodiment) or to the opposite side (in a second embodiment) of a single, relatively wide scraper blade formed of a relatively soft material (i.e., plastic).

Finally, International Patent Publication No. 94/08875 published on Apr. 28, 1994 to Normand J. Morin, titled "Conveyor Belt Scraper," describes a scraper comprising a sheet of flexible plastic which is coiled within a pressurized cylinder. One edge of the plastic extends from a slot in the cylinder, and is forced from the slot and against the conveyor belt by pressurizing the cylinder. The '875 International Patent Publication to Morin is based upon a British patent application, upon which the '249 U.S. patent to the same inventor (discussed further above) is based. The '875 International Patent Publication is also closely related to the '244 U.S. patent to the same inventor, also discussed further above. The same distinctions are felt to apply here.

None of the above inventions and patents, taken either singly or in combination, is seen to describe the instant invention as claimed.

SUMMARY OF THE INVENTION

The present invention comprises a conveyor belt scraper for cleaning or scraping materials from a conveyor belt. The present scraper comprises a transversely disposed inflatable bladder enclosed within a fixed elongate housing, which bears against a single piece blade element to urge the blade element against the belt. In a first embodiment, the housing has a blade slot formed in the upper portion thereof. The bladder and housing are essentially the width of the conveyor belt to which the present device is applied. A relatively thick and deep blade extends essentially the entire length of the slot, with the blade having a length sufficient for extending the entire width of the conveyor belt. When the bladder is inflated, it applies pressure to the lower edge of the blade, forcing the blade upwardly from the slot to bear against the overlying conveyor belt, thereby scraping any accumulated material from the belt. The blade is preferably formed of a plastic material to avoid significant abrasion to the belt. The bladder may be inflated with any suitable fluid (i.e., pneumatic, hydraulic, etc.). A guide is also provided for applying pressure to the opposite side of the belt, against the scraper.

In a second embodiment, the blade has a cross section having a convex arcuate shape with two concave arcuate shapes inwardly disposed of the convex shape. The two concave arcuate shapes define a fulcrum therebetween, with the blade pivoting on an elongate axis through the fulcrum. The fluid tube is positioned beneath the concave arc opposite the conveyor belt. When the tube is inflated, it lifts that side of the blade, urging the opposite edge of the blade against the belt.

Accordingly, it is a principal object of the invention to provide an improved conveyor belt scraper utilizing an elongate inflatable bladder transversely disposed to the belt, with the bladder extending essentially the width of the belt.

It is another object of the invention to provide an improved belt scraper incorporating an elongate housing for the bladder, with the housing having an elongate cleaning blade slot formed in the upper portion thereof.

It is a further object of the invention to provide an improved belt scraper incorporating a cleaning and scraping blade formed of a single piece of thick plastic material and extending essentially the entire width of the housing slot, with the blade being forced upwardly against the belt due to the inflation of the bladder.

An additional object of the invention is to provide an improved belt scraper including a guide disposed across the opposite side of the belt from the scraper blade, for applying pressure to the belt against the blade.

Still another object of the invention is to provide an improved belt scraper including a mounting frame for securing the scraper to the conveyor belt structure.

Yet another object of the invention is to provide an improved belt scraper having a second embodiment in which the scraper blade comprises a convex arcuate shape with two concave arcuate shapes inwardly disposed of the convex shape defining a fulcrum therebetween, with the blade pivoting on an elongate axis through the fulcrum. The fluid tube is positioned beneath the concave arc opposite the conveyor belt and when inflated, it lifts that side of the blade, urging the opposite edge of the blade against the belt.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

DETAILED DESCRIPTION OF THE PREFERRED EMBODIMENTS

The present invention comprises various embodiments of a conveyor belt scraper for scraping and cleaning material residue from a conveyor belt, as used in various industries (maritime, mining, food processing, etc.). As conveyor belts convey materials thereon, particularly loose raw materials, such materials contaminate the belt surface and build up on the surface at least to a certain extent. This is particularly true of wet or damp materials, which tend to cling to the belt surface.

Figure 1:
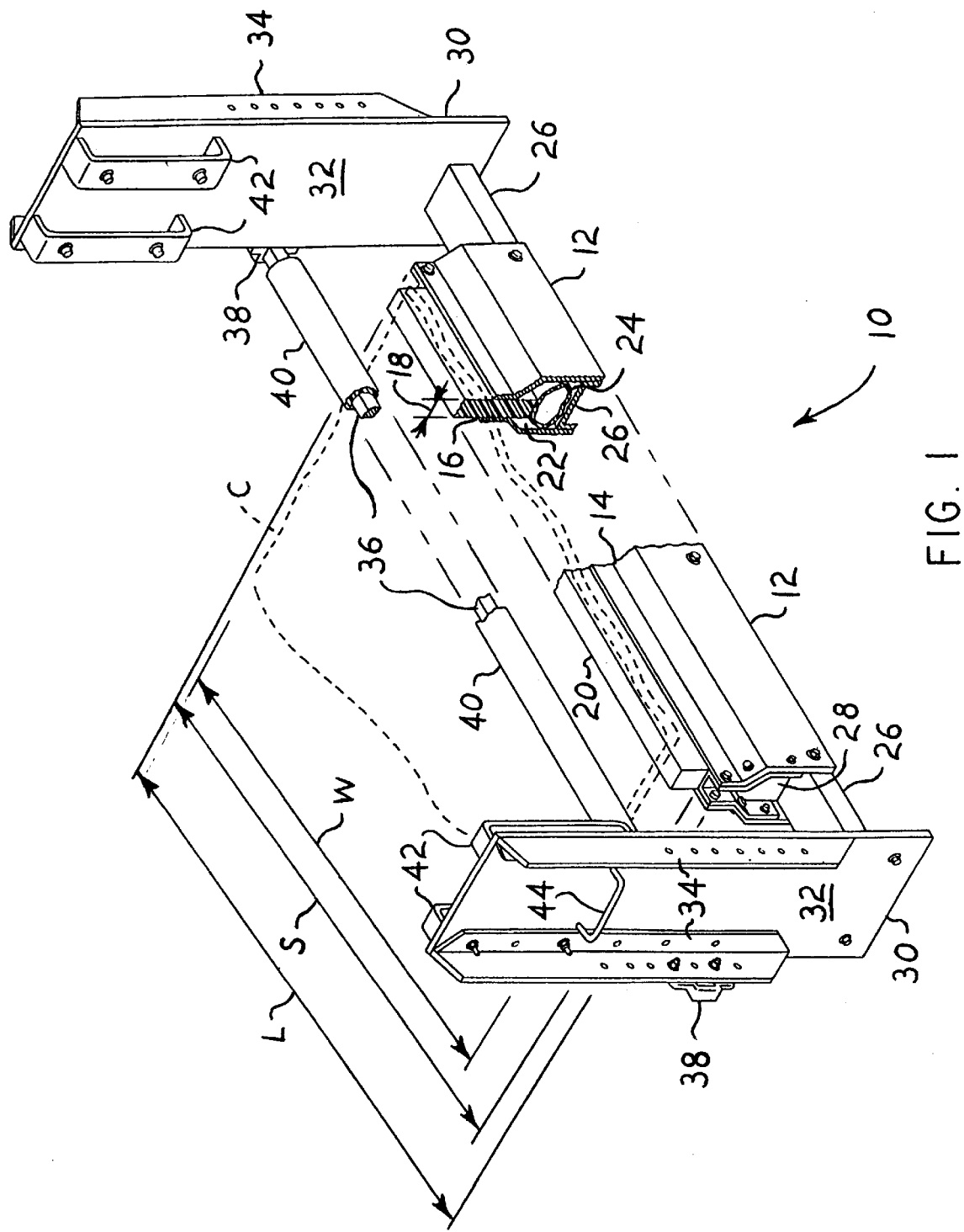
FIG. 1 is a partially broken perspective view of a first embodiment of the present belt scraper, showing various details thereof.

Accordingly, the present belt scraper provides a means of continually cleaning such residue from the outer or working surface of the belt as the belt travels about its run during operation. FIG. 1 provides a perspective view of a first embodiment of the present conveyor belt scraper assembly (a "secondary" type belt scraper), indicated by the reference numeral 10 throughout the drawings. The present belt scraper assembly may be constructed to any practicable width, depending upon the width of the conveyor belt to which it is applied, and is accordingly shown with its center portion broken away to indicate its indeterminate width.

The present conveyor belt scraper 10 generally comprises an elongate housing 12, which is positioned transversely to the conveyor belt C. (The conveyor belt C is shown in broken lines in FIG. 1.) The housing 12 has a length L which is at least equal to the width W of the conveyor belt C, or perhaps slightly longer in order to provide the necessary length to house the belt scraper components described further below.

The housing 12 includes an upper portion 14 with a single elongate scraper blade slot 16 formed therein. The slot 16 has a width 18 which provides sliding clearance for a corresponding single, elongate scraper blade 20 installed therein, with the blade 20 also having a thickness 18 substantially the same as the width of the slot 16 and a scraper length S substantially the same as the slot width S. The housing 12 also includes a hollow interior 22, with a single, elongate inflatable bladder 24 being housed therein. The bladder 24 preferably has a length substantially equal to the length of the interior of the housing 12, and substantially fills the entire volume of the interior 22 of the housing 12 when the bladder 24 is inflated.

The housing 12 is mounted to an elongate base 26 (channel, or other suitable structure) which extends transversely beyond the width of the housing 12 and the conveyor belt C to which the present invention is applied. An end plate 28 serves to close the housing 12 and base 26 structure at each end thereof. (Only one end plate 28 is shown in FIG. 1, but it will be understood that the conveyor scraper 10 of the present invention is symmetrical.)

The base 26 extends between opposite end fixtures 30, with the two end fixtures being essentially identical to one another. These end fixtures 30 serve to attach the scraper assembly 10 to a conveyor belt structure (not shown). Each fixture 30 is formed of a panel 32 of sheet metal or other suitable material, with each panel 32 having an angle 34 secured along opposite edges thereof. The angles 34 provide for the adjustable attachment of a hold down rod or guide 36 by means of fittings 38 which may be adjustably installed along any of the angles 34 as desired. The guide 36 includes a generally cylindrical outer sleeve 40 formed of a relatively soft material (e.g., urethane plastic, or other suitable material) in order to avoid damage to the inner surface of the conveyor belt against which it is deployed. Each of the fixtures 30 also includes means for attaching the assembly 10 to the adjacent conveyor line structure, as with the pair of clamps 42 provided at the upper end of each of the end fixtures 30 to secure about the conveyor structure. Handle means 44 may also be provided on each fixture 30, if so desired.

Figure 2:
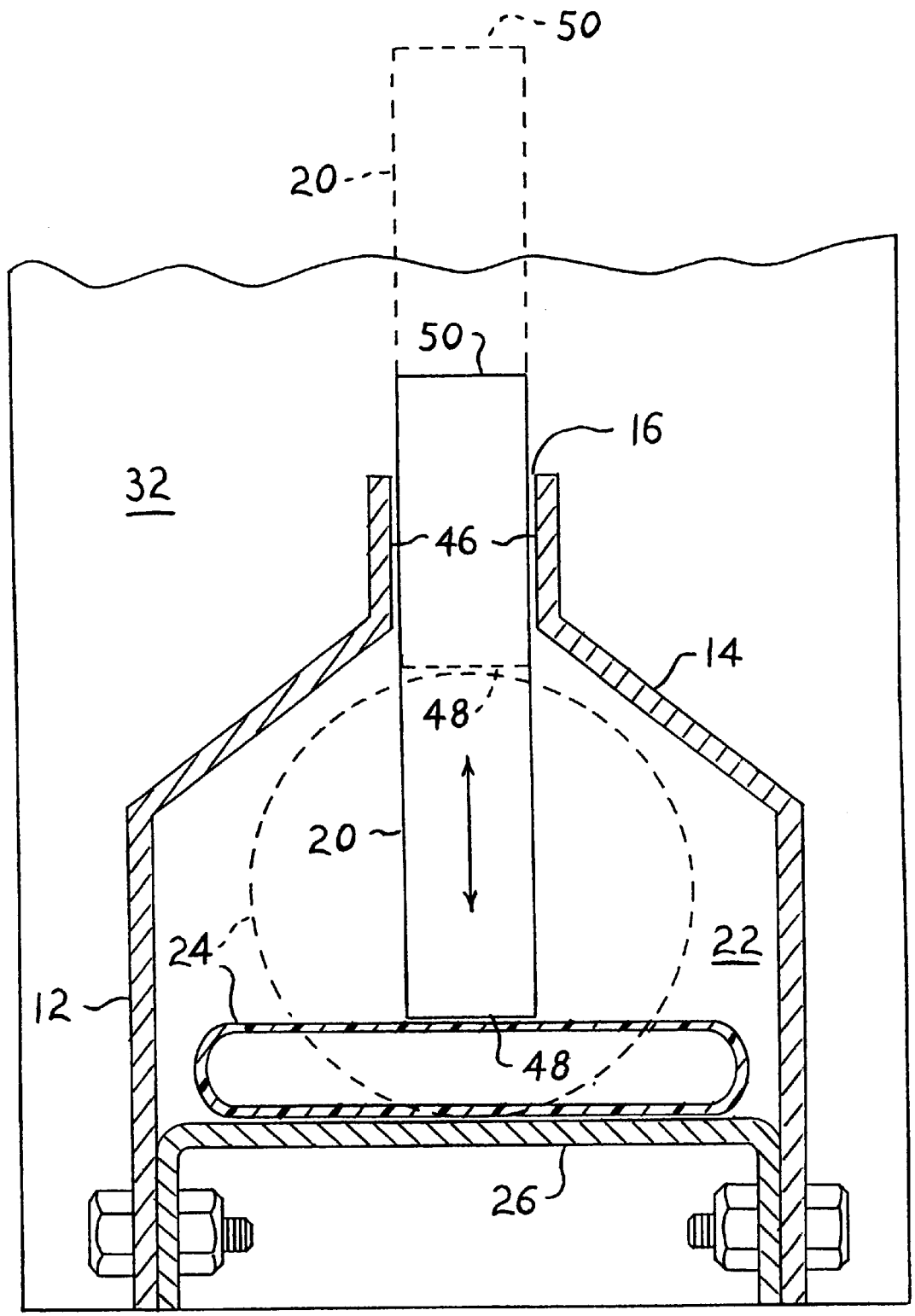
FIG. 2 is an end elevation view in section of the belt scraper apparatus of FIG. 1, showing the deflated and inflated shapes of the bladder therein and corresponding positions of the scraper blade.

FIG. 2 provides a cross sectional elevation view of the housing assembly of the present belt scraper 10. In FIG. 2, the cross sectional shape of the housing 12 is clearly shown, with its relatively wide lower portion including the interior portion 22 for containing the inflatable bladder 24. The upper portion 14 has a gabled shape, narrowing to the scraper blade slot 16 with its substantially vertical walls 46, which serve as guides for the sliding extension and retraction of the scraper blade 20 therebetween.

The inflatable bladder 24 has a normal, deflated configuration generally as shown by the cross hatched solid line condition of FIG. 2, with a more cylindrical shape when inflated, as indicated by the circular broken line within the housing interior 22 in FIG. 2. A bladder having a 4.5 inch diameter when inflated, will deflate to a thickness of about 0.5 inch, thus providing a lift of four inches for the scraper blade 20 installed thereabove. The present belt scraper 10 may utilize a conventional inflatable bladder 24, such as manufactured by Merriman Products, Inc. under the trade name "Windjammer"™. These bladders may be provided in any practicable length, as desired. Other makes, models, and configurations of inflatable bladders may be used as the actuation means of the present belt scraper 10, if so desired. Such bladders may use pneumatic inflation means (air or other pressurized gases) or hydraulic inflation means (water, hydraulic fluid, etc.) as desired.

The scraper blade 20 is formed of a relatively wide piece of material, with the width being oriented in the vertical direction and defined by a lower bladder contact edge 48 and opposite upper conveyor belt scraper edge 50. The width or depth of the blade 20 is preferably sufficient to extend at least slightly above the upper end of the slot 16 of the housing 12 when the blade 20 is resting upon the deflated bladder 24, as shown in solid lines in FIG. 2. Thus, when the bladder 24 is inflated, the blade 20 will raise sufficiently for the scraper edge 50 to contact the overlying conveyor belt and scrape any substantial material residue therefrom.

Preferably, the blade 20 is formed of a relatively soft, nonmetallic material, such as the urethane plastic of which the guide sleeve 40 is formed. This results in a relatively long life for the blade 20, while also protecting the belt from excessive wear and abrasion. As noted above, the blade 20 preferably has a height or depth of several inches (about six or seven inches, although this may be adjusted as required, depending upon the specific belt configuration to which the present invention is applied, and the specific size of the inflatable bladder used.). This depth provides substantial rigidity for the blade 20, which along with the even and uniform pressure provided by the inflatable bladder 24 during the belt scraping operation, provides even and uniform pressure across the entire conveyor belt, regardless of its width.

The belt hold down guide 36 and its sleeve 40 also serve to apply an even and continuous pressure on the opposite, inner side of the belt from the scraper blade, thus further providing even and uniform scraping action of the belt. Many belts used in today's industries have a width of six, seven, or even eight feet, and the rigidity of the scraper blade 20 due to its depth, along with the uniform pressure provided by the bladder 24 and opposing pressure of the guide rod 36, result in an extremely uniform scraping action by the present belt scraper assembly 10. As a result, the present belt scraper 10 requires relatively low inflation pressures for the bladder 24 in order to provide uniform and consistent scraping action, on the order of only about three pounds per square inch, as opposed to other systems requiring much higher pressures.

Figure 3:
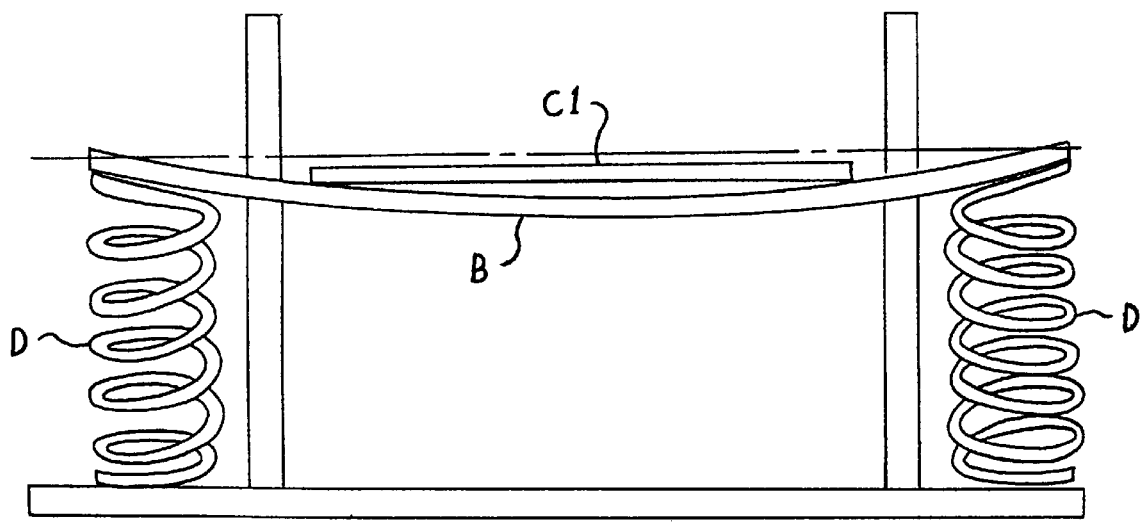
FIG. 3 is a schematic end view of prior art means for scraping a conveyor belt.

FIG. 3 provides a schematic end elevation view in section of a prior art belt scraping apparatus A, in which all of the lifting pressure for the scraper bar B is provided at each end of the scraper. In such prior art systems, some form of scraper lifting or pressure means, such as the springs D shown, or pneumatic or water inflated bags, etc., are provided at each end to apply pressure to the scraper bar B against the conveyor belt C1. As can be seen in FIG. 3, the lack of even and uniform support of the scraper bar B across the belt C1, particularly in the center area, results in the scraper bar B sagging and failing to make good contact with the conveyor belt C1. This results in inefficient cleaning of the belt C1, and/or a need to increase the pressure of the lifting means D. Such higher scraping pressures directed mostly to the edges of the belt C1, result in relatively rapid wear of the scraper bar B, and also to the belt C1.

Figure 4:
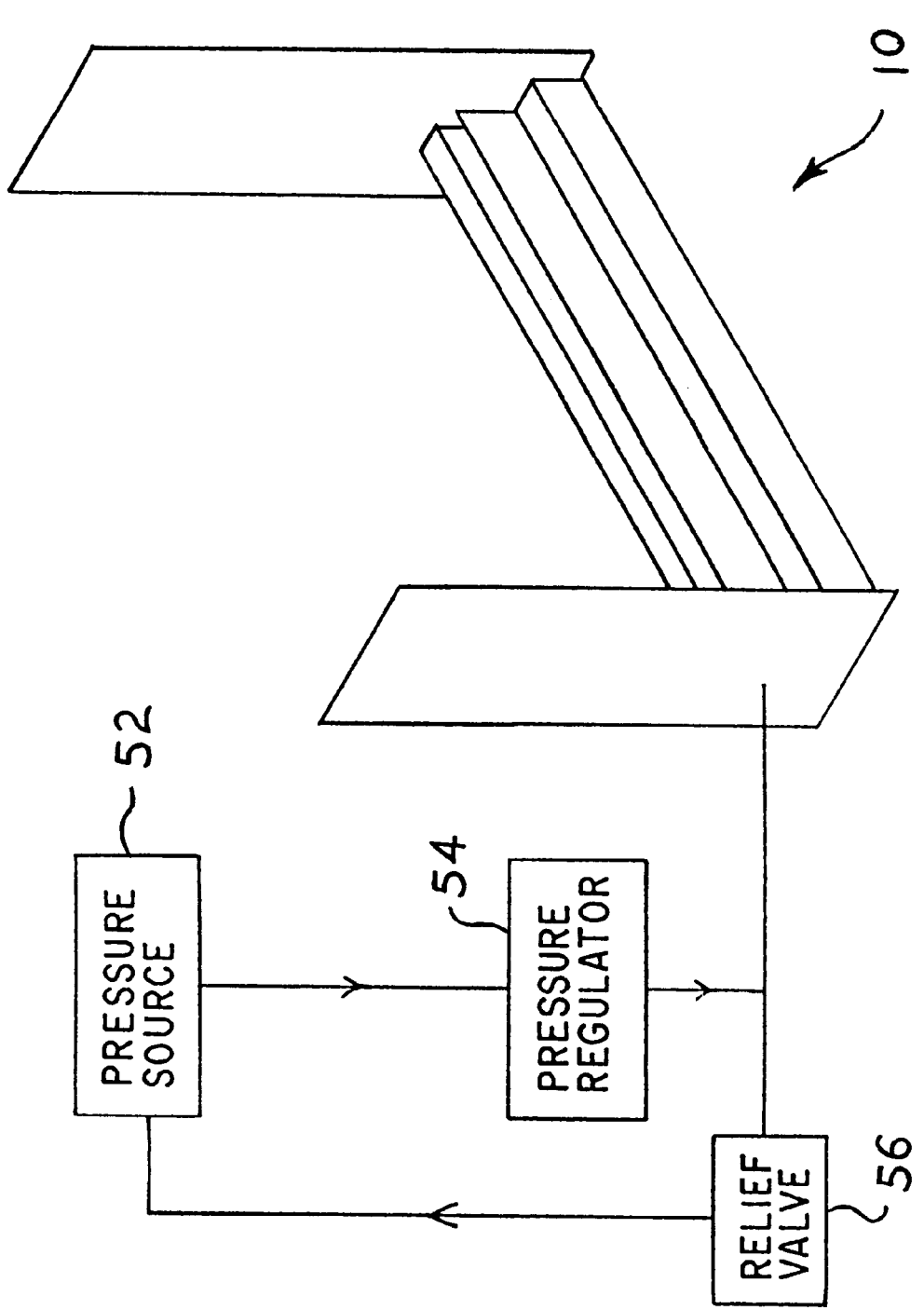
FIG. 4 is a schematic view of a fluid system which may be used to actuate the inflatable bladder and blade of the present scraper.

FIG. 4 provides a schematic view of an exemplary operating system for the present belt scraper 10. A pressure source 52 (pneumatic or hydraulic) is provided to supply operating pressure to the inflatable bladder of the belt scraper 10. The pressure source 52 may be of any suitable conventional type, e.g., an electric motor powering an air or hydraulic pump, etc. Pressurized fluid (air or other gas, hydraulic fluid, etc.) passes from the pressure source 52 to a pressure regulator 54, which reduces the pressure (if reduction is required) to the desired value before the fluid continues to the inflatable bladder of the belt scraper 10.

The regulator 54 may be controlled by an operator as desired, with the regulator 54 being opened to admit the pressurized fluid into the bladder of the belt scraper 10 when belt cleaning or scraping is desired. When pressure is admitted to the bladder, the bladder inflates, raising the scraper blade to engage the outer surface of the belt and scrape any material residue therefrom. When scraping action is no longer needed, the pressure regulator 54 is closed (or the pressure source 52 is shut down) to relieve pressure in the system.

In order to relieve any residual pressure in the system, a relief valve 56 is provided in the return line to the pressure source 52. The relief valve 56 may communicate with the suction side of the pressure source in order to provide positive deflation of the bladder of the belt scraper 10, or may return fluid to a tank or reservoir, relying upon the weight of the scraper blade to deflate the underlying bladder.

Figure 5:
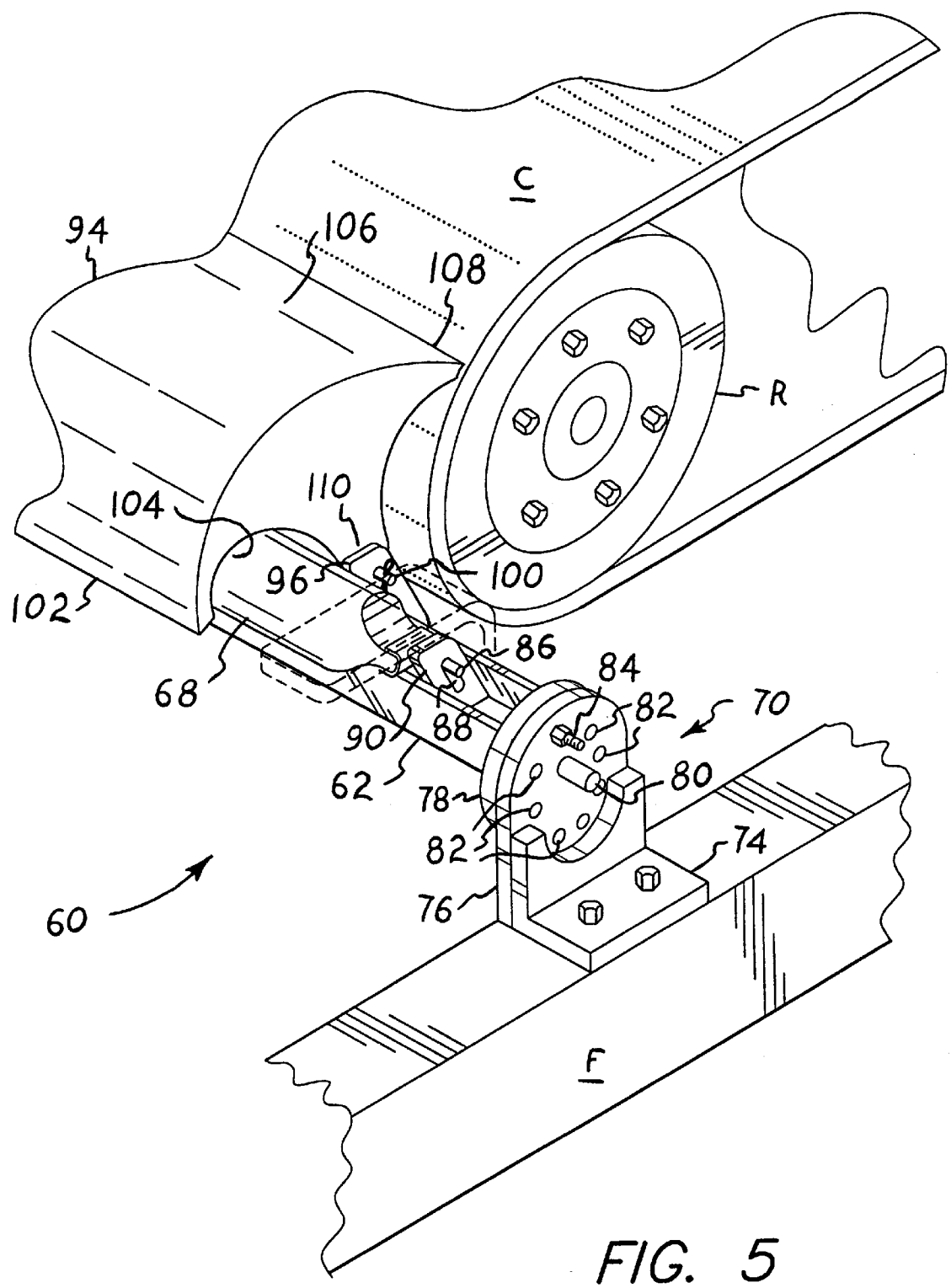
FIG. 5 is a broken away perspective view of a second embodiment of the present conveyor belt scraper, showing the mechanism and operation thereof.
Figure 6:
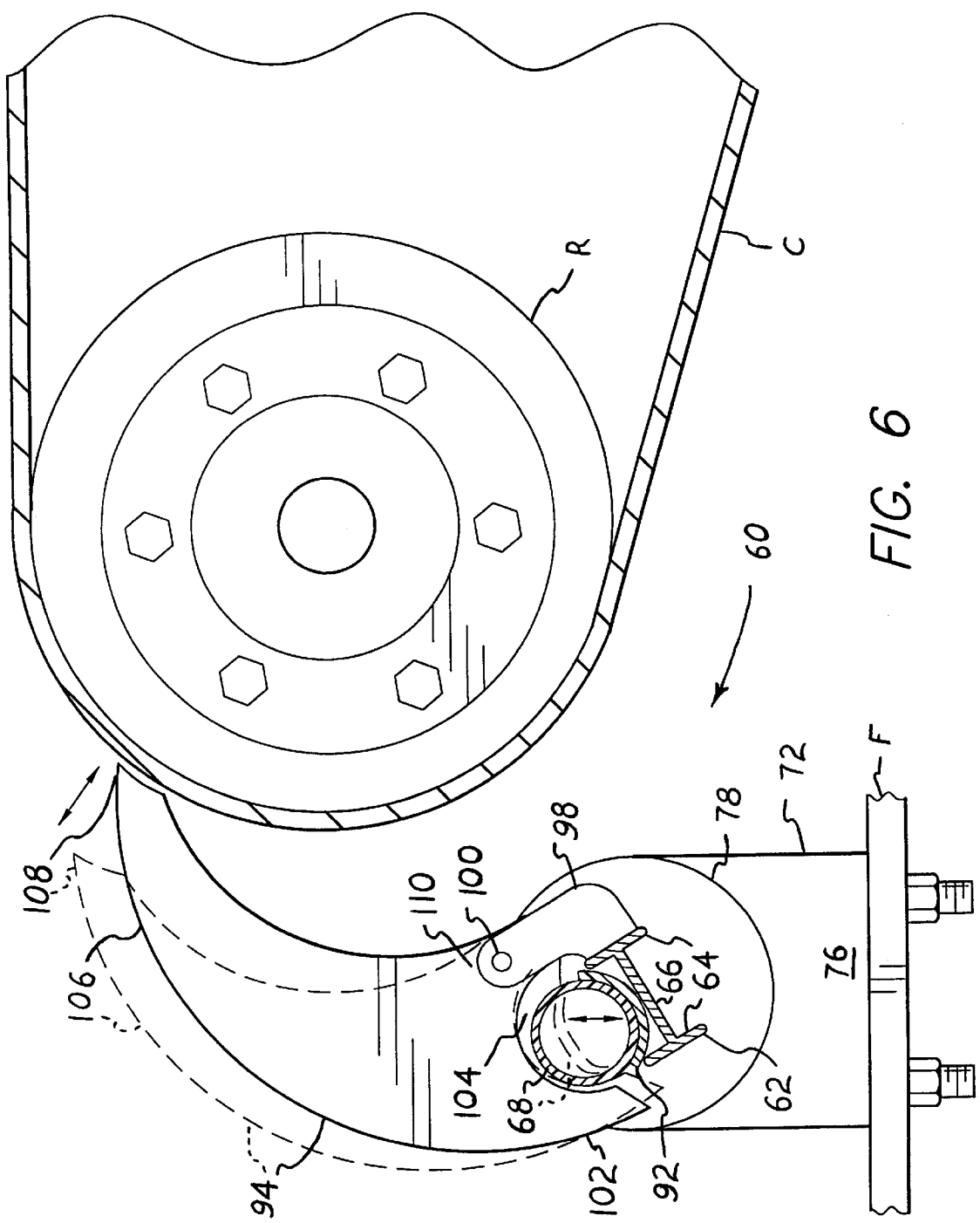
FIG. 6 is an end elevation view in section of the belt scraper apparatus of FIG. 5, showing the actuation of the scraper blade by the inflation of the fluid bladder.

FIGS. 5 and 6 illustrate a second embodiment of a "primary" type of belt cleaner or wiper, designated by the reference numeral 60. Such primary wipers have a blade which bears against the conveyor belt C as it passes over a roller R or the like, rather than bearing against a portion of the free span of the belt C. In this manner, no hold down rod extending across the back of the belt C and opposite the scraper blade is required, as the roller R serves this function of backing up the belt C.

The primary belt wiper or scraper assembly 60 of FIGS. 5 and 6 includes a blade which is urged against the conveyor belt by an inflatable bladder, essentially as in the secondary wiper or scraper assembly of FIGS. 1 and 2 discussed further above. However, rather than the bladder applying pressure directly beneath the edge of the scraper blade and compressing the blade between the bladder and the conveyor belt, the system 60 of FIGS. 5 and 6 utilizes a lever principle to rock the blade against the belt.

An elongate bladder support 62, comprising a conventional steel I beam having opposed flanges 64 with a web 66 extending between the flanges 64 and a length at least somewhat greater than the width of the conveyor belt C, provides support for the inflatable bladder 68 which extends substantially the width of the conveyor belt C and nests along the web 66 and between the two flanges 64 along one side of the support 62. (The flanges 64 and web 66 are more clearly shown in FIG. 6 of the drawings.) The bladder support 62 is in turn held at each end thereof by opposed first and second support mounts 70 and 72, which are in turn bolted or otherwise immovably affixed to the conveyor line structure or frame members F. (The first mount 70 is shown in FIG. 5, with the second mount 72 being shown in FIG. 6 of the drawings.)

The two mounts 70 and 72 are mirror images of one another, and provide for the adjustably pivotable mounting of the transverse mounting (i.e., parallel to the axis of the conveyor roller R) of the bladder support 62 therebetween. Each support 70 and 72 comprises a base 74 (visible only in FIG. 5) which is bolted or otherwise immovably affixed to the conveyor line structure or frame F, with a fixed support plate 76 extending upwardly therefrom. Each support plate 76 has a rotatably adjustable support beam attachment plate 78 mounted thereon, by means of a concentric pin or rod 80 (shown in FIG. 5) which extends from each support beam attachment plate 78 and through a hole or passage in the corresponding support plate 76.

A series of radially displaced index holes or passages 82 (shown in FIG. 5) is provided in each support plate 76, with a single locking hole or passage provided through each rotatable support beam attachment plate 78. The plates 78 are rotatably adjusted relative to the fixed support plates 76, with a locking bolt or pin 84 (FIG. 5) being placed through the single passage of each rotatable plate 78 and through a corresponding one of the index passages 82 of the support plates 76, to fix the support beam 62 angularly as desired relative to the conveyor C and roller R.

The bladder 68 is retained along the side of the beam support member 62 by means of a pin 86 extending from each end of the bag 68, which rides in a slot 88 in a bag or bladder holder plate 90 affixed in each end of the support member 62; this structure is shown in FIG. 5 of the drawings, and is repeated at each end of the bladder 68. Thus, as the bladder 68 inflates, the end pins 86 may move freely within the corresponding slots 88 of the retainer plates 90, while being retained along the side of the I beam support member 62. A bladder rest or saddle 92, comprising an elongate, arcuate channel, rests along the web 66 and between the flanges 64 of the I beam support 62 and is sandwiched between the support 62 and bag 68 to provide smooth support for the flexible bladder 68 and to preclude any cutting or chafing of the bladder or bag 68 by the hard edges of the I beam bladder support member 62. The bladder saddle or rest 92 may be formed of a quarter section of PVC plastic pipe, or other suitable material as desired, so long as the shape and smoothness protects the bladder 68 from damage.

A rigid scraper blade 94 is pivotally secured to the support beam 62 by first and second blade attachment plates 96 and 98, with the first plate 96 being shown in FIG. 5 and the second plate 98 shown in FIG. 6 of the drawings. The two blade attachment plates or lugs 96 and 98 extend from one side of the I beam support 62, and are spaced apart adjacent opposite ends of the beam 62, with the scraper blade 94 pivotally secured between the two plates 96 and 98 by an elongate pivot rod 100 which passes through the blade 94 with opposite ends secured in each blade attachment plate 96 and 98.

The scraper blade 94 is preferably formed of a relatively soft, yet durable and rigid non-metallic material, such as urethane plastic as in the blade 20 of the first embodiment conveyor scraper discussed further above, and has a length at least equal to the width of the conveyor belt C. The blade 94 has a first side 102 having a concave bladder pocket 104 formed transversely therein, i.e., parallel to the pivot axis defined by the pivot rod 100, and an opposite second side 106 with a distal conveyor scraper blade edge 108 extending therefrom, opposite the first side 102. A pivot fulcrum 110 extends transversely between (i.e., parallel to) the two sides 102 and 106 of the blade 94, with the pivot rod 100 passing through the pivot fulcrum 110 and the blade 94 pivoting or rocking about the pivot rod 100 and corresponding pivot fulcrum 110 to the limits defined by the support beam 62 on one side, and the conveyor belt C on the opposite side.

The inflatable bladder or bag 68 resides within the concave bladder pocket 104 of the pivotally mounted blade structure 94. When the bladder 68 is inflated, it lifts the first side 102 of the blade 94 away from the rigidly mounted support beam 62, causing the blade structure 94 to pivot about the pivot rod 100 which passes through the pivot fulcrum 110 of the blade 94 between the two sides 102 and 106 of the blade 94. This results in the conveyor scraper edge 108 of the blade 94 bearing against the conveyor belt C, to evenly and uniformly scrape away any residue or foreign matter from the surface of the conveyor C.

It will be seen that the pressure of the blade edge 108 against the conveyor C is easily adjusted as desired, by adjusting the pressure applied to the inflatable bag or bladder 68 as desired. If less scraping pressure is desired, the pressure to the bladder 68 is reduced, with the bladder 68 being capable of complete deflation if so desired. This is accomplished by means of the operating system comprising the pressure source 52, pressure regulator 54, and relief valve 56 which may be used with the first embodiment belt scraper, and shown schematically in FIG. 4 of the drawings. As in the case of the first embodiment scraper, the inflatable bag or bladder 68 of the second embodiment conveyor scraper of FIGS. 5 and 6 may be inflated using any practicable hydraulic or pneumatic fluid, as desired.

In summary, the embodiments of the present conveyor belt scraping device each provide a much more positive means of scraping and cleaning residue from the working surface of a conveyor belt, than various devices of the prior art. The present scraper mechanism embodiments provide a consistent scraping pressure across the entire width of the conveyor belt, which prior art machines with their typical scraper support means at each end of the scraper blade or bar, cannot do due to the sag or flex of the bar. The present scraper machine embodiments also reduce wear and tear on the belt, due to the relatively soft plastic material of the scraper blade. Yet, the depth of the blade, along with the uniform and consistent support of the blade by means of the inflatable bladder used in the present scraper mechanism, preclude any bending or sagging of the blade, thereby insuring a uniform scraping action across the entire width of even the widest conveyor belts in use.

Accordingly, the present conveyor belt scraper will prove to be of great value in virtually any industry using conveyor belts, and will save considerable time and expense in terms of down time and belt replacement due to its uniform scraping action across the entire width of the belt and the reduction in wear and tear on the belt.

It is to be understood that the present invention is not limited to the embodiments described above, but encompasses any and all embodiments within the scope of the following claims.

I claim:

1. A conveyor belt scraper for scraping and cleaning material residue from a conveyor belt having a width and a conveyor line structure for supporting the conveyor belt, comprising:

an elongate housing transversely disposed relative to the conveyor belt, with said housing having a length at least equal to the width of the conveyor belt;

said housing further including an upper portion having a single elongate scraper blade slot formed therein, with said slot having a width providing clearance for a scraper blade;

a single elongate, inflatable bladder disposed within said housing, with said bladder having a length substantially equal to said housing;

a single elongate scraper blade extendibly disposed within said slot of said housing, with said blade having an upper conveyor belt scraper edge and an opposite lower bladder contact edge;

said blade comprising a rigid piece of material having a thickness substantially equal to said width of said slot, a depth extending from said bladder when said bladder is deflated to a point above said slot of said housing, and a length substantially equal to said slot of said housing;

said scraper edge of said blade bearing evenly and uniformly against the conveyor belt for removing residue material therefrom when said inflatable bladder is inflated;

a transverse hold down guide disposed opposite said blade, for holding the conveyor belt in place against said scraper edge of said blade; and an outer sleeve of urethane plastic disposed about said guide.

2. The conveyor belt scraper according to claim 1, wherein said sleeve is cylindrical in cross section.

3. The conveyor belt scraper according to claim 1, wherein said sleeve is formed of urethane plastic.

4. The conveyor belt scraper according to claim 1, wherein said blade is formed of urethane plastic.

5. The conveyor belt scraper according to claim 1, wherein said housing comprises a lower portion wider than said upper portion, said lower portion having said bladder disposed therein, with said housing tapering upwardly to said upper portion thereof, and with said upper portion of said housing including substantially vertical scraper blade guide walls extending upwardly therefrom and defining said scraper blade slot therebetween.

6. The conveyor belt scraper according to claim 1, including an elongate base with said housing being secured thereto and opposite first and second end fixtures, with said base extending between said end fixtures and with said end fixtures including conveyor belt structure attachment means.

7. The conveyor belt scraper according to claim 1, including an operating system for inflating said bladder.

8. The conveyor belt scraper according to claim 1, including hydraulic inflation means for said bladder.

9. The conveyor belt scraper according to claim 1, including. pneumatic inflation means for said bladder.

* * * * *